US011853253B1

(12) United States Patent
Bshara et al.

(10) Patent No.: US 11,853,253 B1
(45) Date of Patent: Dec. 26, 2023

(54) TRANSACTION BASED REMOTE DIRECT MEMORY ACCESS

(71) Applicant: Amazon Technologies, Inc., Seattle, WA (US)

(72) Inventors: Nafea Bshara, San Jose, CA (US); Leah Shalev, Zichron Yaakov (IL); Erez Izenberg, Tel Aviv (IL); Georgy Machulsky, San Jose, CA (US); Guy Nakibly, Kedumim (IL)

(73) Assignee: Amazon Technologies, Inc., Seattle, WA (US)

( * ) Notice: Subject to any disclaimer, the term of this patent is extended or adjusted under 35 U.S.C. 154(b) by 355 days.

(21) Appl. No.: 14/983,335

(22) Filed: Dec. 29, 2015

Related U.S. Application Data

(60) Provisional application No. 62/233,139, filed on Sep. 25, 2015, provisional application No. 62/182,259, filed on Jun. 19, 2015.

(51) Int. Cl.
*G06F 15/173* (2006.01)
*H04L 67/1097* (2022.01)

(52) U.S. Cl.
CPC .... *G06F 15/17331* (2013.01); *H04L 67/1097* (2013.01)

(58) Field of Classification Search
CPC ....................... G06F 15/17331; H04L 67/1097
USPC ......................................................... 709/212
See application file for complete search history.

(56) References Cited

U.S. PATENT DOCUMENTS

| | | | | |
|---|---|---|---|---|
| 2005/0223118 | A1* | 10/2005 | Tucker | G06F 12/1081 709/250 |
| 2006/0034283 | A1* | 2/2006 | Ko | H04L 69/16 370/392 |
| 2006/0072562 | A1* | 4/2006 | King | H04L 45/745 370/389 |
| 2006/0274787 | A1* | 12/2006 | Pong | G06F 12/0875 370/469 |
| 2013/0110959 | A1* | 5/2013 | Sharp | G06F 9/5016 709/212 |

* cited by examiner

*Primary Examiner* — Kevin S Mai
(74) *Attorney, Agent, or Firm* — Klarquist Sparkman, LLP

(57) ABSTRACT

Apparatus and methods are disclosed herein for remote, direct memory access (RDMA) technology that enables direct memory access from one host computer memory to another host computer memory over a physical or virtual computer network. In one example, RDMA functionality is provided by combining a host executing instructions for RDMA software applications with dedicated hardware accelerator, where the host has access to substantially all RDMA connection context (e.g., configuration, status, state machine, counters, etc.) and a hardware accelerator stores a portion of the context information for a set of currently active transactions. The hardware accelerator derives a transaction identifier from header information in received RDMA packets and performs a local RDMA operation using at least a portion of the received data, a destination address of the location RDMA operation being based at least in part on a memory address determined using the transaction identifier.

32 Claims, 10 Drawing Sheets

TRANSACTION BASED REMOTE DIRECT MEMORY ACCESS

CROSS REFERENCE TO RELATED APPLICATIONS

This application claims the benefit of U.S. Provisional Application No. 62/233,139, filed Sep. 25, 2015, and U.S. Provisional Application No. 62/182,259, filed Jun. 19, 2015, both of which are incorporated herein by reference in their entirety.

BACKGROUND

Remote Direct Memory Access (RDMA) allows for direct memory access from one host computer to another host computer. Examples of RDMA protocols include Infiniband, RDMA over converged Ethernet (RoCE), and iWARP. RDMA technology can be used to create large, massively parallel computing environments, and can be applied in a cloud computing environment. Cloud computing is the use of computing resources (hardware and software) which are available in a remote location and accessible over a network, such as the Internet. Users are able to buy these computing resources (including storage and computing power) as a utility on demand.

DETAILED DESCRIPTION

I. Introduction to the Disclosed Technology

Figure 1:
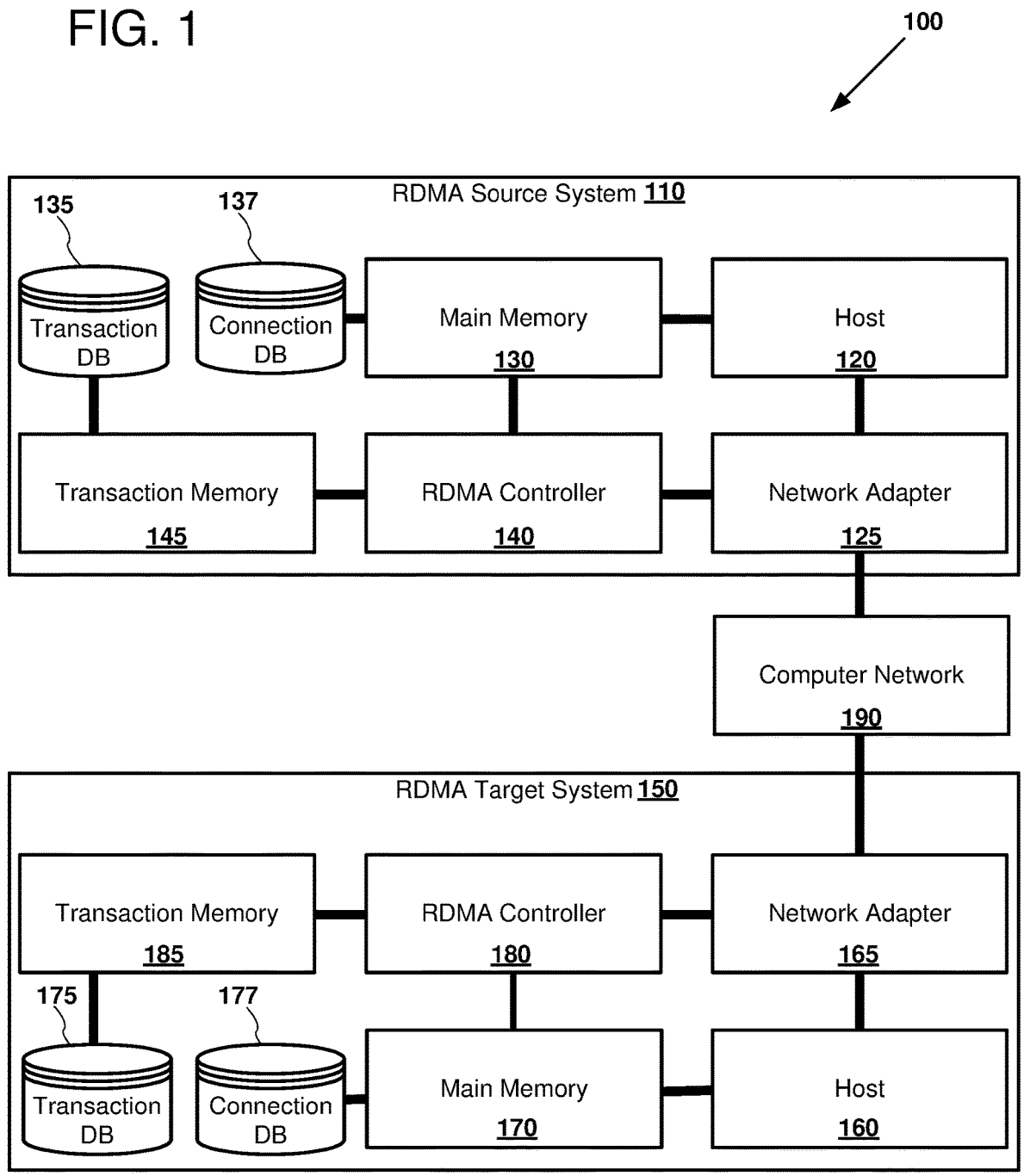
FIG. 1 is block diagram of a suitable system environment in which certain examples of the disclosed technology can be implemented.

Apparatus, methods, and computer-readable storage media are disclosed herein for remote, direct memory access (RDMA) technology that enables direct memory access from one host computer memory to another host computer memory over a physical or virtual computer network. The disclosed direct memory access techniques allow for memory operations to be performed while bypassing at least certain aspects of an application and/or operating system hosted by a central process unit (CPU). In some examples of the disclosed technology, RDMA functionality is provided by combining a host executing instructions for RDMA software applications and dedicated hardware accelerator, where the host has access to substantially all RDMA connection context (e.g., configuration, status, state machine, counters, etc.) and a hardware accelerator stores information for a reduced set of currently active transactions.

In some examples of the disclosed technology, a connection database is provided that stores connection information for millions or billions of RDMA connections that can be serviced by an RDMA source or target system. A transaction database is provided that can store information for a smaller number of active transactions for a subset of the connections (e.g., information for hundreds or thousands of transactions). The disclosed technology can be scaled easily because the host has access to the system memory and can support many connections. The hardware accelerator can use a relatively limited size and relatively faster memory to save information for only currently active transactions. Each active RDMA transaction (e.g., RDMA read, RDMA write, etc.) can be identified using transaction ID. Certain example RDMA implementations are not protocol specific and can be implemented for standard and/or non-standard RDMA protocols.

In certain examples of the disclosed technology, a number of RDMA operations can be performed including zero copy or direct data placement protocol (DDP) operations that allow a hardware controller coupled to a network adapter to perform memory copies directly to and from application memory space, thereby reducing host CPU and memory load. In some examples, the use of virtual addresses for memory access and other memory operations is provided. In some examples, low latency memory operations over a computer network can be performed including: RDMA read, RDMA write, RDMA write with immediate value, atomic fetch and add, atomic compare and swap, and other suitable RDMA options over different forms of physical network connections. The physical media supported for performing RDMA operations includes wired connections (e.g., megabit or gigabit Ethernet, Infiniband, Fibre Channel over electrical or fiber optic connections) and wireless connections, including RF connections via Bluetooth, WiFi (IEEE 802.11a/b/n), WiMax, cellular, satellite, laser, infrared and other suitable communication connections for providing a network connection for the disclosed methods. Examples of suitable RDMA protocols that can be adapted for communication according to the disclosed technologies include, without limitation: Infiniband, RDMA over Converged Ethernet (RoCE), iWARP, and other suitable communication protocols including other open and proprietary communication protocols.

In disclosed examples of RDMA communication, two or more RDMA-enabled systems include host hardware, including processors, memory, and network adapters that are configured to communicate with each other over a computer network that can include networking switches and routers. Application programs are hosted by operating systems that are executed using the processors. In some examples, a hypervisor supports operation of one or more operating systems and/or virtual machines on a host. RDMA commands issued using an appropriate protocol can specify addresses and spans of data for which to read and write between two or more hosts. In some examples of the disclosed technology, the disclosed RDMA techniques allow directly copying from application memory on a first host, to application memory on a second host, without copying data to system memory, or requiring execution of instructions by the host CPU.

II. Example System Environment

FIG. 1 is block diagram 100 of a suitable system environment in which certain examples of the disclosed technology can be implemented. The system includes an RDMA source system 110 and an RDMA target system 150 that are configured to communicate with each other via a computer network 190. For example, the RDMA source system 110 can send data for RDMA transactions via the computer network 190 to the RDMA target system 150. The sent RDMA data includes fields that can be used by the RDMA target system 150 to identify the RDMA transaction. The RDMA target system 150, in turn, receives the data for the first RDMA transaction and can identify the transaction based on the fields included with the RDMA data.

The RDMA source system 110 includes a host 120, which can include one or more processors such as CPUs, GPUs, microcontrollers, and/or programmable logic. The host is coupled to the computer network 190 by a network adapter 125 that is configured to send and receive communications to the computer network. Examples of suitable interfaces that can be used by the network adapter 125 include Ethernet, wireless, and cellular network connections. The host 120 has access to main memory 130, which can include physical and virtual memory, including DRAM, SRAM, Flash, and/or mass storage devices.

The main memory 130 and/or other storage can be used in conjunction with the host 120 to implement a transaction database 135 and a connection database 137. The transaction database 135 includes data relating to particular RDMA transactions being actively processed by the RDMA source system 110. The connection database 137 stores information regarding RDMA connections being processed by the RDMA source system 110. In typical examples, the number of connections stored in the connection database can be much larger for the connection database 137 vs. the transaction database 135—on the order of millions or billions of RDMA connections in the connection database, vs. thousands of active transactions in the transaction database (in contemporary systems). In some examples, additional real or virtual processors are used to implement the databases 135 and 137. The RDMA source system 110 also includes an RDMA controller 140 that can be used to control aspects of RDMA operations performed at the RDMA source system 110.

The RDMA controller 140 is coupled to a transaction memory 145 that can store data associated with currently-active RDMA transactions being processing by the RDMA controller 140. While any suitable memory technology can be used to implement the transaction memory 145, it will be more typical that the transaction memory 145 will be implemented with memory technology having properties desirable in managing transactions with the RDMA controller 140. For example, in some applications, use of SRAM may be desirable to implement the transaction memory 145, while in other examples, flash memory may be more desirable, depending on the particular parameters of an instance of the RDMA source system 110. In some examples, the transaction memory 145 includes local cache memory for a portion of the main memory 130. In some examples, the transaction memory 145, RDMA controller 140, and network adapter 125 are attached to a single network interface card that is coupled to a main board for the host 120 within the RDMA source system 110. In some examples, some or all of the transaction database 135 is stored in the transaction memory 145, and some or all of the connection database 137 is stored in the main memory. In some examples, information stored in the connection database 137 is partially stored in a bulk storage device (e.g., flash memory or a hard drive), in network-accessible storage, and/or in a distinct database server that is queried by the host. In some examples, the RDMA controller 140 is not connected to the main memory 130 directly, but accesses data in the connection database (e.g., to populate the transaction database 135 for a new active transaction) via an I/O interface, bus, or other connection mechanism.

The RDMA target system 150 includes similar components as the RDMA source system 110, including a host 160, which can include one or more processors and is coupled to the computer network 190 via a network adapter. The host also has access to main memory 170 that can be used to implement the databases 175 and 177. Further, the RDMA target system 150 also includes an RDMA controller 180 coupled to transaction memory 185. The RDMA controller 180 is configured to, responsive to receiving an RDMA initiation packet indicating initiation of an RDMA transaction, generate and store a first transaction identifier in the transaction memory 185. The RDMA controller 180 can generated the first transaction identifier based at least in part on information in an RDMA initiation packet. The RDMA controller 180 can store context data for performing the RDMA transaction in transaction memory 185. Further, the RDMA controller is configured to receive additional RDMA packets for the initiated RDMA transaction, generate a second transaction identifier based on RDMA header information in the packets, and with the second transaction identifier, retrieve at least a portion of the context data from the first memory. The second transaction identifier can be generated by extracting a designated field in the RDMA header. In some examples, the second transaction identifier is generated by combining information from other fields in the RDMA or other headers of an RDMA packet. Using the retrieved context data, the RDMA controller 180 can perform at least a portion of the RDMA transaction.

In some examples, the RDMA controller 180 is further configured to, based on the context data stored in the first memory, determine a target location in the main memory, the determined target location being used for the performing at least a portion for the RDMA transaction. In some examples, the RDMA controller 180 is further configured to validate the RDMA transaction by comparing context data stored in the transaction memory 185 to the data received with the additional RDMA packets.

Implementations of the components within the RDMA target system 150 can use similar components as those described above regarding the RDMA source system 110, although they do not necessarily need to be identical or similar in configuration and/or capacity.

The computer network 190 can carry bidirectional data, including RDMA packets, between the RDMA source system 110 and the RDMA target system 150. The computer network 190 can include public networks (e.g., the Internet), private networks (including virtual private networks), or a combination thereof. The network may include, but are not limited to personal area networks (PANs), local area networks (LANs), wide area networks (WANs), and so forth.

The computer network 190 can communicate using Ethernet, Wi-Fi™, Bluetooth®, ZigBee®, 3G, 4G, or other suitable technologies.

Each of the hosts 120 and 160 depicted in the block diagram 100 can execute computer-readable instructions implementing RDMA software and can be configured to implement any RDMA standard. For example, RDMA software can implement at least a portion of the network transport layer and packet validation. The RDMA software can also perform protocol operation and management operations. In some examples, the software can implement connection validation and maintenance, while in other examples, some of the operations performed by the software can be performed by specially-configured hardware. Computer-readable instructions implementing the RDMA software can also be used to send signals to the RDMA controllers 140 and 180 with instructions on the manner in which to read and write information to transaction memories 145 and 185, respectively. In some examples, the RDMA controllers act as accelerators and enable faster communication between the source system and the target system. However, in certain cases the RDMA controller 140 and/or RDMA controller 180 may not be configured to accelerate RDMA traffic in a particular scenario. In such cases, the respective hosts 120 or 160 can take over the transaction and operate without the assistance of the RDMA controllers. Further, it should be noted that, for ease of explanation, network traffic is generally described as being transmitted from the RDMA source system 110 to the RDMA target system 150, but that bi-directional communication between the source system and the target system can occur simultaneously or alternatively.

Each of the RDMA controllers 140 and 180 include hardware that can perform a number of different transactions for processing RDMA traffic. The RDMA controllers can be implemented using a digital signal processor, a microprocessor, an application-specific integrated circuit (ASIC), and soft processor (e.g., a microprocessor core implemented in a field-programmable gate array (FPGA) using reconfigurable logic), programmable logic, or other suitable logic circuitry.

The RDMA controllers 140 and 180 identify packets related to RDMA operations and can perform one or more of the following operations. The controller can validate RDMA headers contained within packets of data. This validation can include validating fields of the RDMA header and validating error correction codes, such as cyclic redundancy check (CRC) codes or other header verification mechanisms. The controller can parse RDMA headers and extract fields used for processing and accelerating RDMA transactions. For example, the controller can identify an active transaction based on a transaction identifier derived from the RDMA header. The transaction identifier can be derived based on one or more specific transaction ID fields in the RDMA header, a combination of multiple fields of the RDMA header, or matching data of the header with a list of expected values (e.g., using a content-addressable memory (CAM) or a transaction table). The controller can further validate header fields including RDMA header fields against information previously stored for the current transaction. Further, the controller can implement RDMA acceleration techniques including one or more of: DDP enable, DDB address, header splitting, data trimming, DMA/queue selection, and/or target server/virtual machine acceleration. For example, RDMA hardware acceleration can result in writing received RDMA data directly to application memory space (e.g., directly to the main memory 170) in a "zero copy" mode. In other words, the RDMA controller 180 can write RDMA data, and perform other RDMA options, thus bypassing the host 160, and therefore reducing processor load and memory traffic between the host 160 and the main memory. Further, the controller 180 can notify software for the software executing on the host 160 and forward the RDMA information, thereby reducing the number of software operations used and further reducing latency.

In some examples of the disclosed technology, RDMA implementations are connection-based implementations. In such examples, a database including connection data is maintained for each RDMA connection. The context information that can be stored in the database for each connection can include: connection information, connection state information, state machine information for the connection, counters, buffer scatter gather lists, and other suitable context data. In some examples, hardware support is provided to implement one or more databases storing context information on a per connection basis, as well state machine state on a per connection basis.

In certain examples of the disclosed technology, hardware and methods are provided for implementing RDMA functionality by combining software and/or hardware accelerators. In some examples, the software implementation (e.g., computer-executable instructions that are executed on a host processor) maintains data for context state for one or more RDMA connections. The context state that can be maintained by the instructions can include configuration information, status information, state machine information, counters, network addresses, hardware identifiers, and other suitable data. In such examples, hardware is configured to store a subset of the context information that relates to current active RDMA transactions that are being processed by the respective host computer.

In some examples, such RDMA configurations allow for improved scaling because connection context maintained by the host CPU, which has access to the system main memory and can support a large number of connections while the accelerator (e.g., an RDMA controller) can use a limited amount of faster memory to save a smaller portion of information regarding currently active transactions. Each of the currently active transactions can be identified using a transaction identifier (transaction ID), which can be generated using a number of different techniques, including combinations and subcombinations of transaction ID generating techniques disclosed herein.

In certain examples, implementations of an RDMA controller are not limited to a single protocol, but the same hardware can be used to implement two or more standardized and/or non-standardized RDMA protocols. In some examples, RDMA controller hardware can initiate and perform direct data placement of RDMA data, thereby reducing load on other host processor resources, including CPUs and memory. Further, disclosed transaction based accelerations can be performed for RDMA read, RDMA write, and other suitable RDMA transactions.

It should be noted that while the terms "transaction" and "transaction ID" are associated with particular RDMA operations such as RDMA reads and writes, the use of transactions is not limited to these operations, but can also be associated with other RDMA entities or variables. For example, a transaction ID can be associated with a portion of memory (e.g., a memory space, memory region, or memory window), in which case the disclosed RDMA acceleration techniques can associate RDMA packets, RDMA operations, and/or RDMA messages with a single transaction ID and use context information association with the transaction ID to perform DDP and other acceleration or protection operations. In such examples, a transaction database can be initialized during memory registration of the associated memory portion.

For example, when a transaction ID is associated with a memory window, multiple RDMA write operations can be linked to the same transaction ID and thus, associated with the same memory window. Thus, the associated operations can be verified with any associated memory restrictions that apply to the region and can use the properties of the memory region that are registered in a transaction database.

In some examples of the disclosed technology, scalability of the system can be improved by maintaining a large amount of RDMA connection information in a database maintained by a host in main memory, while maintaining active transaction information in a relatively smaller hardware database. In some examples, overall load on memory resources is reduced by performing zero copy operations using DDP. In some examples, processor load (e.g., CPU load) is reduced by an RDMA controller performing a large portion of RDMA operations, while forwarding hints and other information related to RDMA transaction to the host processor. In some examples, transaction latency is improved by the hardware performing much of the operations associated with certain RDMA transactions.

In some examples, the disclosed technologies allow for the performance of RDMA transactions involving out-of-order data. Thus, data loss, data arriving at a target host in a different order than it was sent, and other issues associated with out-of-order data can be alleviated. For example, the use of transaction IDs transparent to the host allows the RDMA controller to re-order, request resending, and perform other operations that make an RDMA transaction carried out with out-of-order data appear to be in-order to the host. In some examples, an RDMA controller supports both out-of-order and in-order transactions using any suitable RDMA protocol. In some examples, use of certain examples of the disclosed RDMA controllers allow for implementation of out-of-order RDMA transactions using RDMA protocols that do not natively support such out-of-order transactions. In some examples, in-order transactions are supported with RDMA protocols that natively support only out-of-order transaction implementations.

Figure 2:
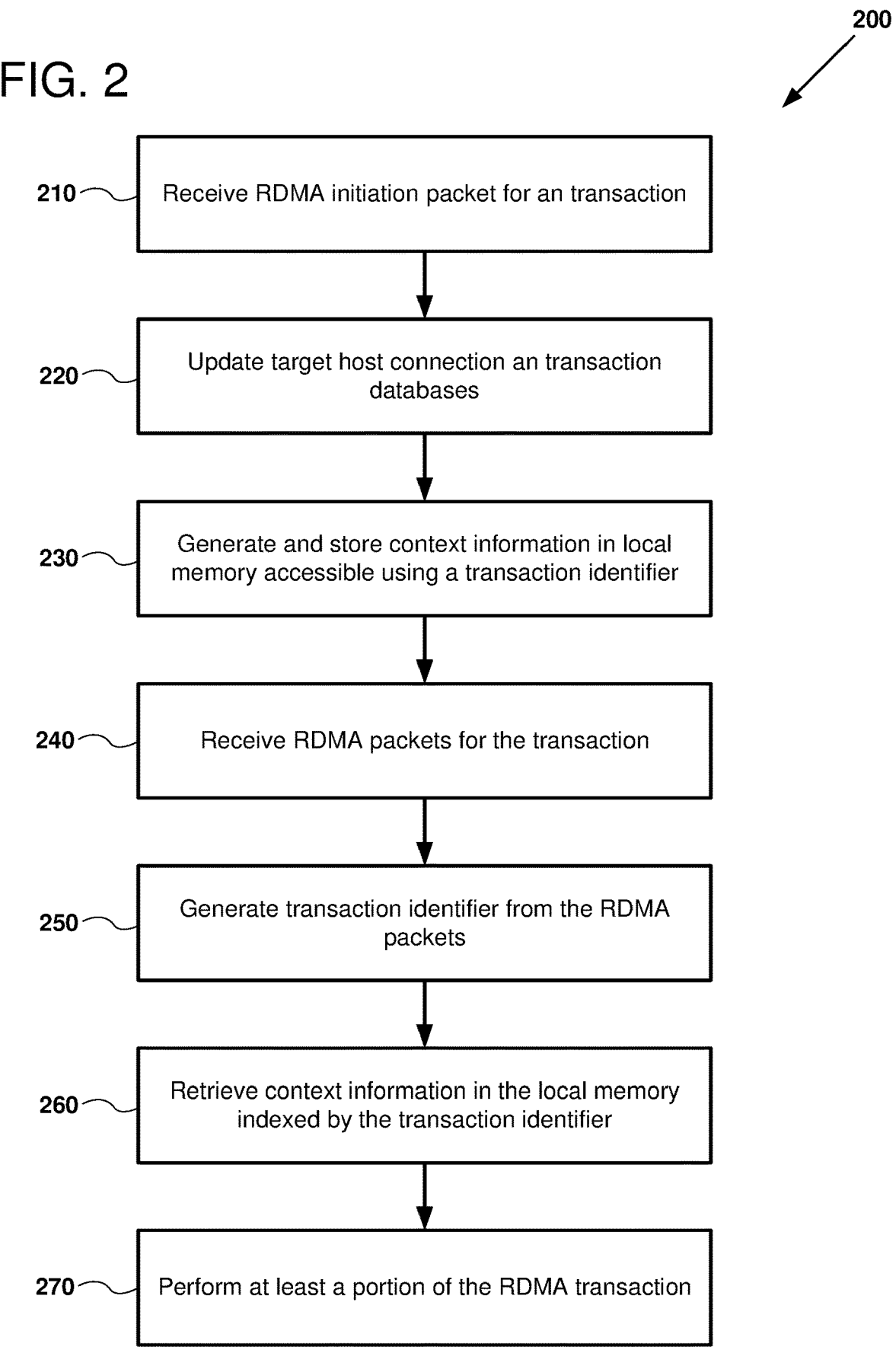
FIG. 2 is a flowchart outlining an example method of performing RDMA transactions, as can be performed in certain examples of the disclosed technology.

III. Example Method of Performing an RDMA Transaction with a Transaction Identifier FIG. 2 is a flowchart 200 outlining an example method of performing RDMA transactions, as can be performed in certain examples of the disclosed technology. For example, the example system of FIG. 1 can be used to implement the illustrated method.

At process block 210, an RDMA initiation packet for a transaction is received. The RDMA initiation packet can be implemented using standardized commands in such standards as Infiniband or RoCE, while in other examples, a proprietary standard is used to implement the RDMA initiation packet. In some examples, the initiation packet includes two or more packets of information. For example, an RDMA initiation packet can be generated by the host 120 of the RDMA source system 110 illustrated in FIG. 1, and sent to the RDMA target system 150 via the network adapter 125, which is coupled to the computer network 190, and the network adapter 165. When the RDMA initiation packet is received, the target host (e.g., host 160) performs a check to determine whether the operation can be accelerated. After the RDMA initiation packet is received, the method proceeds to process block 220.

At process block 220, a target host connection and target host transaction database are updated with information based on the RDMA initiation packet. For example, computer-readable instructions executing on the target host 160 can generate database commands to update the transaction database 175 and/or connection database 177.

At process block 230, context information based on the RDMA initiation packet is generated and stored in a local memory (e.g., the transaction memory 185 that is coupled to the RDMA controller 180 but not directly accessible to the target host 160) that is accessible using a transaction identifier. For example, the RDMA controller 180 can read information from the RDMA initiation packet to generate context information and store the context information in the transaction memory 185. Examples of context information can include, for example, information regarding memory addresses at which to store information for the RDMA transaction, parameters such as data to write or shift as part of executing the RDMA transaction, stride lengths and other parameters suitable for looping RDMA operations and other suitable context information. The transaction identifier can be derived from information in the RDMA header, information in the payload of the RDMA initiation packet, or based on data from a certain number of fields in the RDMA header and/or payload. For example, Internet Protocol (e.g., IPv4 or IPv6) addresses, computer names, identifiers generated by software, or other suitable identifying information can be used to generate the transaction ID.

In some examples, the context information is stored in a static random access memory (RAM), dynamic random access memory (DRAM), electrically erasable programmable read only memory (EEPROM), flash memory, ferroelectric random access memory (FeRAM), magnetoresistive random access memory (MRAM), or memristor-based memory. The memory can be indexed using the transaction identifier in a number of different ways. For example, an associative array, a content-addressable memory (CAM), transaction table, or other suitable form of indexing can be used. In some examples, the transaction ID is used as an index to translation table, an associative array, or a CAM to allow for ready access to the context data as additional packets of an RDMA transaction are processed. In some examples, a memory is partially associative and indexed using the transaction in a similar fashion as a cache. In some examples, a circuit traverses a set of indexes to find a memory address associated with the transaction ID. In some examples, all or a portion of the transaction ID is used as a memory address for retrieving context data.

At process block 240, one or more additional RDMA packets for an active transaction are received. For example, the RDMA target system 150 can receive additional RDMA packets via its network adapter 165. The RDMA controller 180 can perform processing to extract header information, including RDMA header information from the RDMA packets. Other fields, either within the RDMA header, other headers of the packets, and/or other fields in the payload of the RDMA packet, can be extracted at process block 240. After extracting the data, the method proceeds to process block 250.

At process block 250, the method generates a transaction identifier based on data received in the RDMA packets. For example, a transaction ID can be generated from data directly coded in the RDMA header, or can be based on other fields extracted at process block 240. Similar techniques such as those used to generate the transaction identifier at process block 230 can be used to generate the transaction identifier. After the transaction identifier for the RDMA packet has been generated the method proceeds to process block 260.

At process block 260, context information in a local memory (e.g., the transaction memory 185) is retrieved using the transaction identifier generated at process block 250 as an index. The retrieved context information can be used to accelerate the RDMA transaction. For example, if a destination address is described in the context information, the RDMA controller 180 can perform at least a portion of the RDMA write operation without using context data stored in the transaction database 175 and/or the connection database 177. After context information suitable for determining how to carry out the RDMA operation is identified the method proceeds to process block 270.

At process block 270, the RDMA controller 180 performs at least a portion of the associated RDMA operation. For example, an RDMA read, RDMA write, atomic fetch and add, atomic compare and swap, data manipulations, or other suitable RDMA operations can be performed using the RDMA controller.

In some examples, the receiving host(s) (e.g., target host 160) are configured to wait for completion information indicating receipt of the expected packets for one or more currently active transactions. It should be noted that an active transaction can include data that is transmitted in one packet, or in multiple packets. After the expected packets have been received, and the RDMA operations specified have been performed, the RDMA target system 150 generates completion descriptors which can include information about acceleration performed by the controller and hence that can be used to further offload RDMA operations in subsequent RDMA transactions.

It should be noted that operations in implementing an RDMA protocol can be divided between the host 160 and the RDMA controller 180. Further, in certain examples, operations can be issued in-order or out-of-order, depending on protocols and connections used. The host then allocates resources in both the transaction database 175 and the connection database 177, and configures the RDMA controller 180 with information regarding the subsequent packets to be received as part of the RDMA transaction.

Completion information can then be transmitted via the computer network 190 to the RDMA source system 110. The host 120 receives completion information that includes relevant information about the transaction, including DDP acceleration information, header split information (which enables hosts to receive packet headers when the payload is written directly to the target memory using DDP), extracted RDMA fields associated with the transaction, detected transaction ID, transaction information, and state information. The host 120 can also receive error indications and perform error recovery operations such as fulfilling retransmission requests, performing connection management, and performing link management.

It should be noted that application of disclosed RDMA acceleration techniques can vary depending on the associated RDMA operation. For example, for write operations a memory region can be associated with a specified set of one or more transaction identifiers and multiple write operations (performing in-order or out-of-order) can be accelerated using this transaction ID. In other examples, these other multiple write operations can be segmented into multiple packets (in such examples, the RDMA target system 150 can invalidate the order of reception of packets associated with a specific RDMA command or message using the host 160 and/or the RDMA controller 180).

IV. Example RDMA Operations Performed with Acceleration and/or Validation

Figure 3:
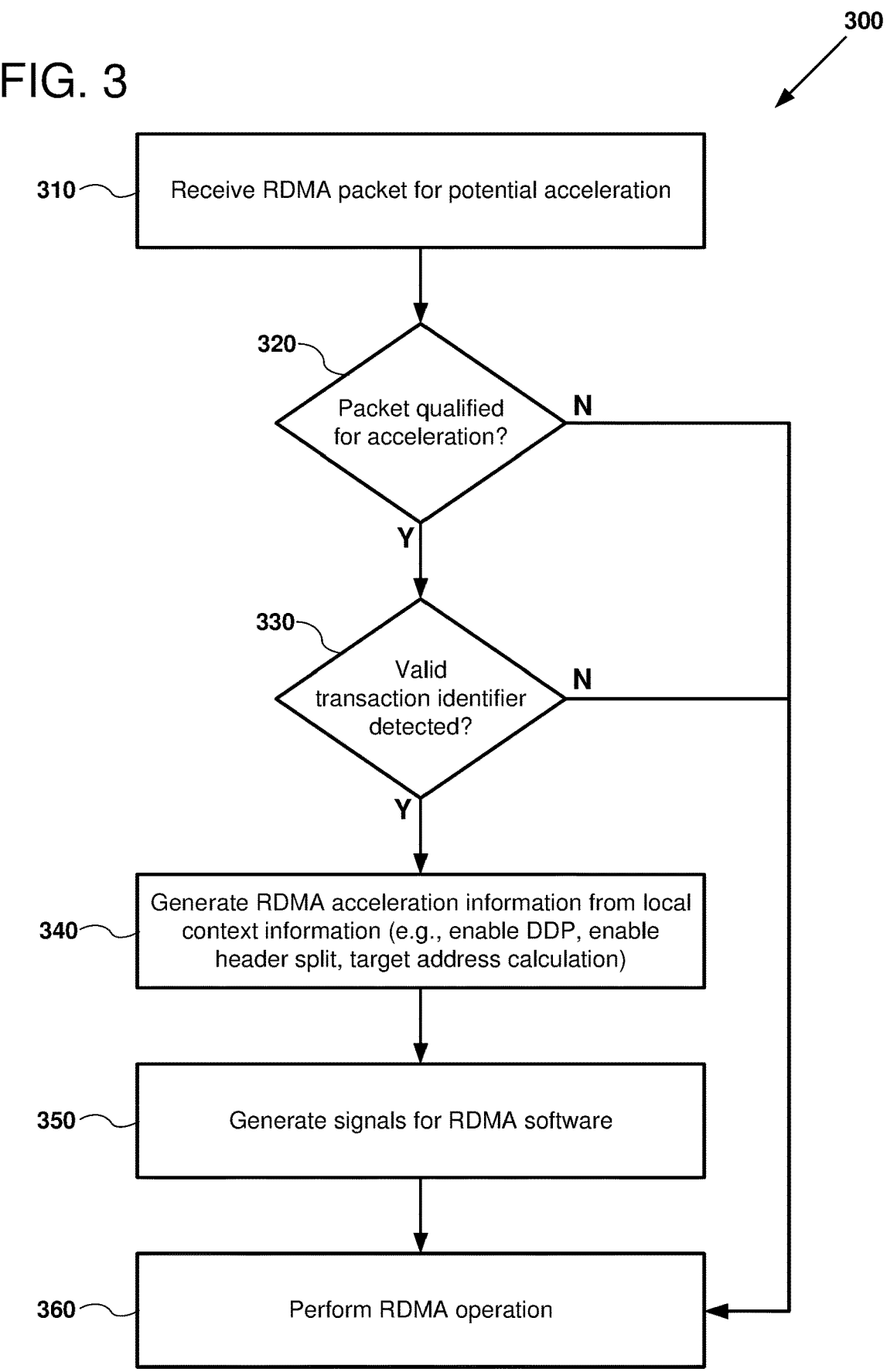
FIG. 3 is a flowchart outlining an example method of performing RDMA operations, as can be performed in certain examples of the disclosed technology.

FIG. 3 is a flowchart 300 outlining an example method of performing RDMA operations including acceleration, as can be performed in certain examples of the disclosed technology. For example, the system illustrated and described above regarding FIG. 1 can be used to implement an example method of FIG. 3.

At process block 310, an RDMA packet for potential acceleration (e.g., handling using an acceleration technique) is received. For example, RDMA packets generated by the RDMA source system 110 sent over the computer network 190 can be received by network adapter 165 and processed using the RDMA controller 180, without relying on the host 160. In some examples, prior to receiving the RDMA packet, identifying data is received including instructions to initiate the RDMA transaction. The initiating can include deriving and storing the identifying data in a memory associated with a derived transaction identifier. In some examples, an active RDMA transaction is one of a plurality of two or more RDMA transactions, and the plurality of RDMA transactions are assigned to memory locations within the same portion of memory of an RDMA host. In some examples, a plurality of RDMA packets are received via the network adapter in an out-of-order fashion from an order in which the RDMA packets were sent.

At process block 320, the method determines whether the received packet is qualified for acceleration. For example, packets received for certain operations, or packets received from certain machines or network locations may be designated as not being qualified for acceleration. Examples of verification operations to determine whether a packet is qualified for acceleration can include verifying the RDMA protocol, for example by determining whether different protocols are being carried on the same communications link, detecting multiple RDMA protocols, and detecting an RDMA protocol within any encapsulating and/or tunneling transport protocols. If unqualified packets are detected, the RDMA accelerator (e.g., RDMA controller 180) can hand off further processing of the packet to a host (e.g., target host 160) by proceeding to process block 360. If, on the other hand, it is determine that the packet is qualified for acceleration, the method proceeds to process block 330.

At process block 330, the method determines whether a transaction identifier is detected for the received RDMA packet. The transaction identifier can be derived from the RDMA header, or based on certain field in the RDMA header. For example, a transaction identifier can be generated by using data stored in one or more header fields of the received RDMA packet and retrieving context data by performing a content-addressable memory (CAM) using the second transaction identifier. If, for example, a record associated with the transaction identifier is not found in the CAM, then a suitable transaction identifier is determined to not have been detected. A match for the transaction identifier can be performed using any suitable type of memory, including: volatile memory or non-volatile memory, and wherein the local memory further comprises at least one or more of the following: static random access memory (RAM), dynamic random access memory (DRAM), electrically erasable programmable read only memory (EEPROM), flash memory, ferroelectric random access memory (FeRAM), magnetoresistive random access memory (MRAM), or memristor-based memory.

In some examples, the transaction identifier is used to validate the RDMA transaction by comparing context data stored in the first memory to the data received with the additional RDMA packets. If the comparing indicates a match with the context data stored in the first memory. In some examples, if a transaction identifier is matched, the RDMA controller retrieves context data from a transaction memory and compares all or a portion of the retrieved context data to all or a portion of the data received in the RDMA packet being processed. If the transaction identifier matches and the context data matches or is consistent with data in the RDMA packet, then the method determines that a valid transaction identifier is detected and the method proceeds to process block 340. If the comparing indicates that the transaction identifier is missing or invalid, or that the context data does not match or is impermissibly inconsistent with the data in the RDMA packet, then an invalid packet is detected, and the method sends a signal to the processor to cause the processor to perform the RDMA transaction, and the method proceeds to process block 360 in order to hand off processing of the RDMA packet to the host 160. In some examples, the RDMA controller can determine to drop certain types of invalid RDMA packets, without passing the packets to the host for further processing. In some examples, the RDMA controller can signal to a source RDMA system to resend all or a portion of data associated with the RDMA transaction.

At process block 340, RDMA acceleration information is generated from local context information stored in a local memory associated with the transaction identifier. For example, the RDMA controller 180 can generate the acceleration information by retrieving context data from a memory using the transaction identifier as an index or address. Examples of suitable acceleration information can include, but is not limited to, enable DDP, enable header splitting, and calculation of target addresses. Once the RDMA acceleration information has been generated, the method proceeds to process block 350.

At process block 350, signals are generated for performing the RDMA operation. For example, the RDMA controller 180 can send signals to the host 160 and/or to the main memory 170 in order to perform the operation. Signals generated for performing the RDMA operation include acceleration information used to perform the transaction. For example, this information can include information for enabling direct data placement and zero copy operations, addresses used for DDP (direct data placement), information for enabling and splitting headers from associate payloads. For example, header data can be written to a different buffer address than the payload and used by instructions executing on the host 160. For example, data from the payload can be written to the main memory directly by the RDMA controller 180 while information from the header is provided to the host 160 for controlling the RDMA operation. For example, a header length field can be used to determine the location of the header split depending on data in the header and the associate protocol. Further the generated control signals can include signals for enabling data trimming for protocols where the user payload includes additional information that is to be written to different memory locations for enabling zero copy and other offload operations. For example, data at the start of the packet and/or at the end of the packet can be trimmed, as well as other metadata including CRC, hash results, protected information, or other metadata. In some examples of data trimming, the information can be simply dropped, while in other examples, the data is verified or forwarded from the controller to the host for additional processing. Once the signals have been generated, the method proceeds to process block 360.

At process block 360, based on the control signals generated at process block 350, an RDMA operation is performed, for example, an RDMA read, and RDMA write, or other such operations based on the signals indicating RDMA acceleration information generated at process blocks 340 and 350. The RDMA operations performed at process block 360 can use the RDMA controller 180 alone, the host 160 alone, or a combination of the controller, host, and/or other logic within the RDMA target system 150. The RDMA operation is performed using the generated signals from process block 350 and forwarded to an RDMA engine for writing data to the memory.

In some examples of the disclosed technology, for the operations performed at process block 360, a destination address of the location RDMA operation being performed is based at least in part on a memory address determined using the derived transaction identifier. In some examples, performing the RDMA transaction includes a direct memory access operation that copies data from the additional RDMA packets to the main memory without using a host processor. In some examples, performing a local RDMA operation is based at least in part on a memory address determined using the transaction identifier. In some examples, the determined memory address is an address to a physical memory, and intermediate physical memory, or a virtual memory coupled to a central-processing unit (CPU).

In some examples, performing the RDMA transaction includes copying data from the additional RDMA packets to the main memory without using the host processor. In some examples, performing the RDMA transaction includes generating physical memory address without using a host memory translation table In some examples, a physical memory address is generated without using a host memory translation. In some examples, the data is divided based on an associated memory transaction type, including data, header, trimmed data, and/or metadata. Thus, different data types are written to different memory locations in the transaction memory 185 and/or the main memory 170. Upon completion of the RDMA operation at process block 360, additional information can be generated regarding the transaction and transmitted back to the RDMA source system 110. For example, acceleration information, statistics, and status, already made packet fields, and/or debug information can be sent to the RDMA source system 110. Such information can be used in generating subsequent RDMA requests. Further, the RDMA header field can be verified by determining the existence and/or data contained one or more of the following: constant fields, RDMA command fields, RDMA status fields, packet sequence number, key fields, protection information fields, and CRC fields. Further, the verification can include that the particular RDMA command is supported for acceleration in the particular configuration performing the method. It should be noted however, that acceleration can be applied to any type of RDMA command, although certain implementations may only allow certain commands to be accelerated.

V. Example Data Packet with RDMA Header and Payload

Figure 4:
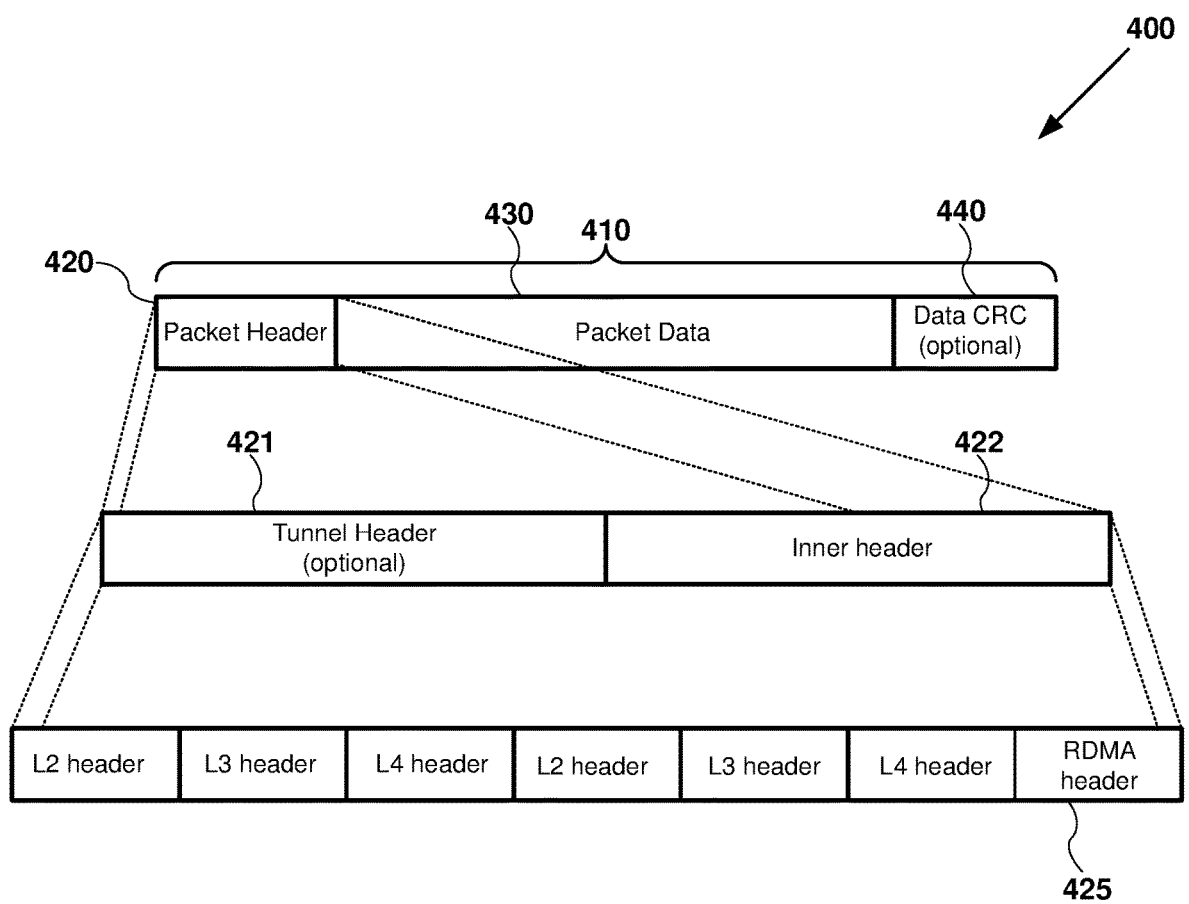
FIG. 4 is a diagram depicting a number of fields included in an example data packet.

FIG. 4 is a diagram 400 depicting a number of fields included in an example data packet 410. It should be noted that the depicted fields can be fixed length or variable length, depending on the associated protocol. Further, the depiction of FIG. 4 is a simplified example used to illustrate header processing, but is not limited to the examples shown.

As shown, the data packet includes a packet header 420, packet data 430, and in some cases, a CRC 440 for the packet data. As shown at FIG. 4, the packet header 420 is further elaborated and can include a tunnel header 421 and an inner header 422. For example, the tunnel header 421 can be associated with a security or other transport protocol while the inner header 422 includes data for the header itself. As shown, the optional tunnel header 421 includes data corresponding to different layers of a network protocol hierarchy (e.g., an L2 header, and L3 header, and an L4 header). The inner header includes an L2 header, an L3 header, and L4 header, as well as an RDMA header 425. The L2, L3, and L4 headers correspond to different header levels in a network protocol stack (e.g., according to a TCP/IP protocol stack). The RDMA header 425 can be implemented in a number of different communication layers depending on the implemented RDMA protocol. In some examples, the RDMA header 425 includes header CRC data that can be used to validate the header information. The RDMA header 425 can be specified according to the RDMA protocol being used for the data packet.

A number of different fields can be encoded in the RDMA header 425 and the particular names and functionalities for the fields can vary depending on the particular RDMA protocol employed. For example, the RDMA header 425 can include data regarding queue numbers, connection identifiers, transaction identifiers, packet sequence numbers, message sequence numbers, RDMA commands, RDMA op codes, keys, protection data, memory keys, memory addresses, message length and size data (e.g., describing the complete length of the associated RDMA operation, for example as a number of bytes or a number of packets), host number, host identifier, Internet Protocol (e.g. IPv4 or IPv6) addresses, and other suitable data.

VI. Example Components and Methods for RDMA Acceleration

Figure 5:
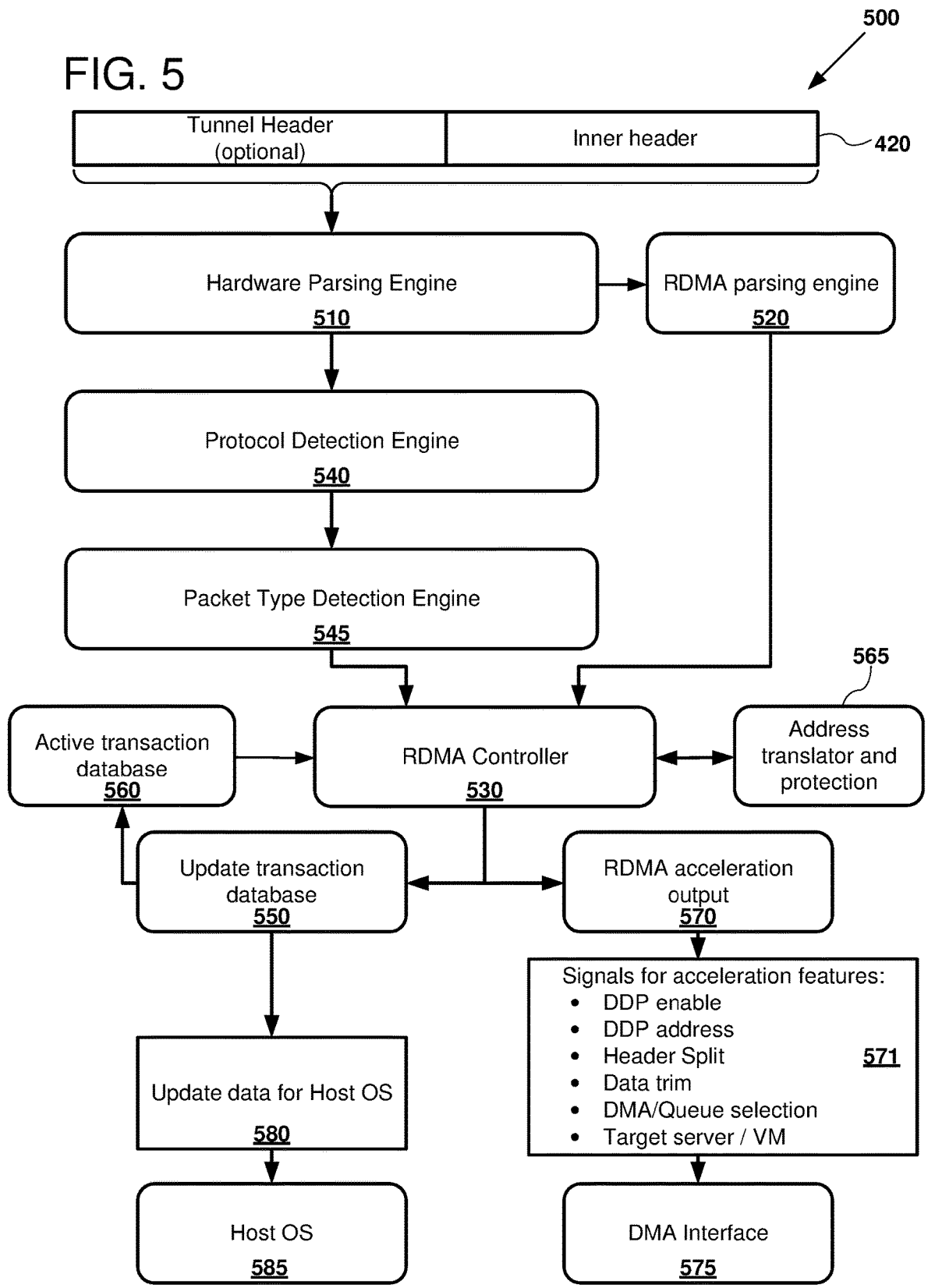
FIG. 5 is a diagram outlining example components and methods for performing RDMA acceleration, as can be performed in certain examples of the disclosed technology.

FIG. 5 is a diagram 500 outlining example components and methods for performing RDMA acceleration, as can be performed in certain examples of the disclosed technology. For example, the system described above regarding FIG. 1 can use RDMA data such as that discussed above regarding FIG. 4 to perform disclosed acceleration operations.

As shown at FIG. 5, an RDMA packet header 420 is passed to a hardware parsing engine 510. For example, the hardware parsing engine can be implemented using a RDMA controller, and in some cases, host resources, to perform parsing of the header. Protocol information detected with the received RDMA packet can be used to detect the type of RDMA protocol and RDMA header and this can in some cases be based on information contained in any of the extracted header fields discussed above regarding FIG. 4. The parser extracts information for the RDMA header and passes it to an RDMA parsing engine 520. The RDMA parsing engine extracts relevant fields for RDMA processing and sends them to an RDMA controller 530. Detection of the RDMA protocol used to generate the packet can be performed using a protocol detection engine 540. In a similar fashion, protection of the RDMA packet types can be performed using the packet type detection engine 545 The RDMA controller 530 can use the extracted protocol type, the extracted RDMA information, in order to generate a transaction ID. The transaction ID is used to update transaction database 550 and access the active transaction database 560 in order to receive context information that was previously stored for the currently processed transaction. Further, as shown, the RDMA controller 530 can communicate with an address translator 565 in order to generate addresses for performing RDMA operations. In some examples, the address translator provides an address directly to a physical memory of the host system. In some examples, the address translator provides an intermediate physical address, such as can be used with a memory management unit, or a virtual address (e.g., in virtualized systems with multiple virtual machines using RDMA services).

The RDMA controller can then use context data from the transaction database, protocol type information, extracted RDMA information, and address information to generate the RDMA acceleration output 570. Examples of signals 571 that can be used for acceleration features include DDP enable, DDP address, header splitting, data trimming, DMA selection, queue selection, and identification of target servers and/or virtual machines. These signals 571 are used by DMA interface circuitry 575 that is coupled to a memory in order to complete the requested RDMA operation. The RDMA controller 530 can also modify some fields from the transaction database for use with subsequent packets for the RDMA transaction. For example, the transaction database can be incremented to point to a next set of memory addresses for performing an RDMA write operation. In some examples, the target address can be updated and used for the next received packet for the next transaction in which case the address is incremented for use with the next received packet. In some examples, the address is incremented with different values for example NTU or payload link. The increment value can be changed for a particular RDMA transaction or different RDMA protocols. The updated information can also be sent to the host for updating at process block 580 where it can be processed using a host operating system 585 executing with a host processor. In some examples, the target address can be updated and stored in the local active transaction database 560, thereby providing a transparent way of incrementing the address, without sending the information to the host operating system.

In some examples, the address used for DDP can be a physical address, an intermediate physical address, such as can be used with a memory management unit, or a virtual address (e.g., in virtualized systems with multiple virtual machines using RDMA services). In some examples the address translation service provided as part of the RDMA operation and stored in the transaction database. Some examples of operations an RDMA controller can perform are address translation and address protection functions, such as raising an exception or otherwise trapping attempted accesses to invalid or protected sections of memory.

VII. Example Method of Generating Memory Addresses

Figure 6:
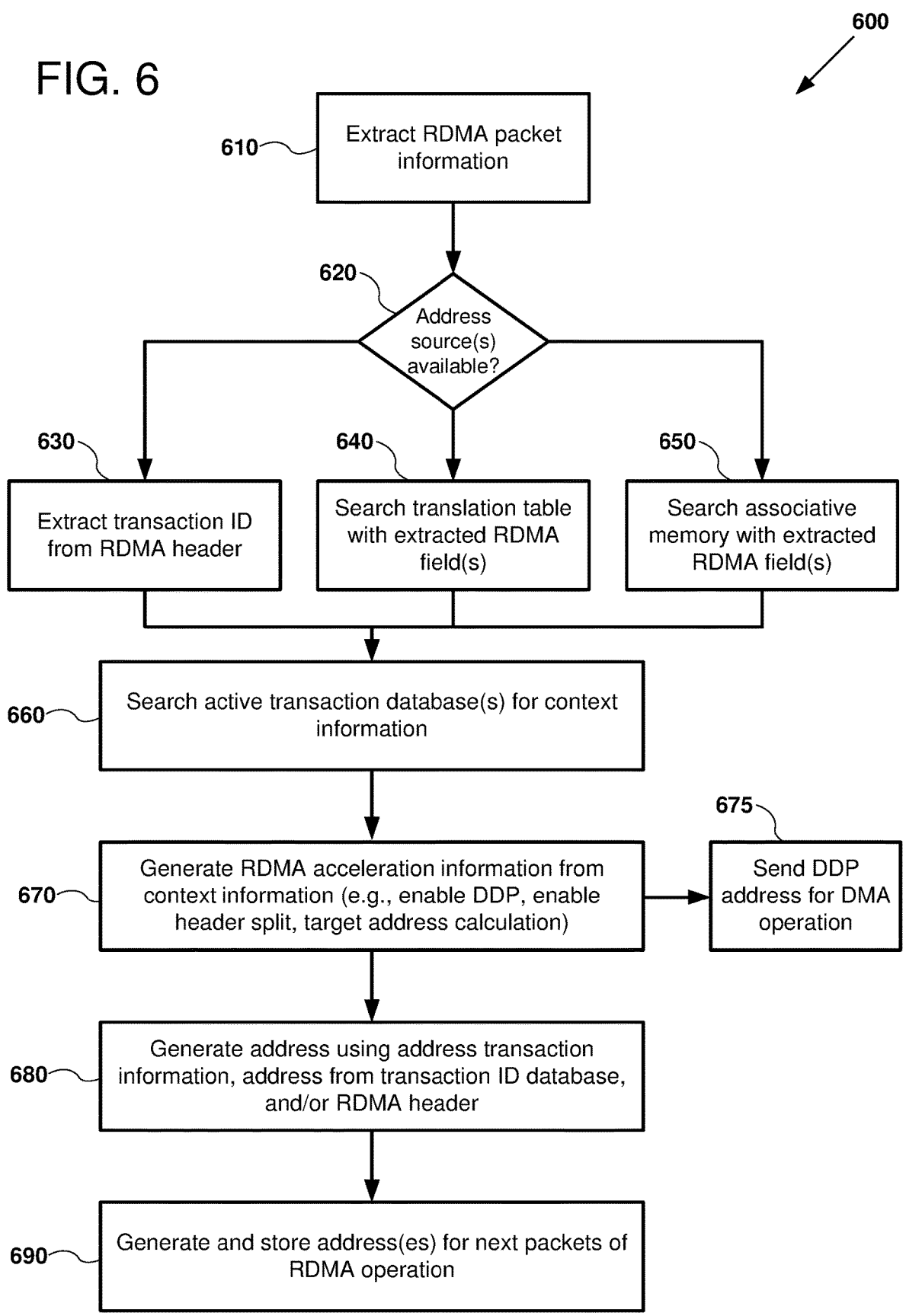
FIG. 6 is a flowchart outlining an example method of generating addresses, as can be performed in certain examples of the disclosed technology.

FIG. 6 is a flowchart 600 outlining an example method of using a transaction database and generating addresses, as can be performed in certain examples of the disclosed technology. For example, the system of FIG. 100 can be used to implement the method depicted in FIG. 6.

At process block 610, one or more data fields are extracted from an RDMA packet. At process block 620, the method determines which of one or more address sources are available to use in extracting context information. For example, based on the protocol for the received packet, the address source to use for the packet can be determined. It should be noted that in some examples of the method, an RDMA controller can process RDMA packets received that are encoded in a plurality of two or more different RDMA protocols.

At process block 630, transaction ID information is extracted directly from the RDMA header. At process block 640, a translation table is searched based on data stores in one or more data fields extracted from the RDMA header. At process block 650, an associative memory is searched using one or more RDMA data fields, RDMA header fields, as keys to search the associative memory. For example, a CAM can be used as the associative memory. One or more of the sources for process block 630, 640, and/or 650 can be used.

At process block 660, one or more active transaction databases are searched for context information using the transaction IDs received from process block 630, 640, and/or 650. If a record is found for the transaction ID, the method proceeds to process block 670 in order to generate RDMA acceleration information.

As shown in FIG. 6, the RDMA acceleration information generated at process block 670 can include enabled DDP information, header splitting information and/or target address calculation information.

At process block 675, the DDP address is sent to DMA circuitry for performing a RDMA operation. In some examples, this allows for a host MMU to be bypassed by directly producing a physical address to be used for a DMA operations (for a portion of the RDMA operation).

At process block 680, an address is generated using address transaction information, address information from a transaction identifier database, and/or from the RDMA header, in order to generate a physical address. For example, for RDMA operations that are specified in multiple packets (e.g., for a range of multiple memory locations), the next memory address for data in the next packet can be generated and updated in the transaction database for use once the next RDMA packet is received. Once the physical address has been generated, the method proceeds to process block 690.

At process block 690, the method generates and stores addresses for next packets of RDMA operation. For example, the address can be incremented by a specified amount and the address can be stored in a location memory as contacts information associated with the transaction identifier and/or in a transaction or connection database.

VIII. Example Compute Service Provider

Web services are commonly used in cloud computing. A web service is a software function provided at a network address over the web or the cloud. Clients initiate web service requests to servers and servers process the requests and return appropriate responses. The client web service requests are typically initiated using, for example, an API request. For purposes of simplicity, web service requests will be generally described below as API requests, but it is understood that other web service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a web service receives the API request from a client device, the web service can generate a response to the request and send the response to the endpoint identified in the request.

Generally speaking, a "plug-in" includes, but is not limited to, a software component that plugs into a larger application to add functionality. When an application supports plug-ins, it can, for example, enable customization without recompilation. Additionally, in some instances, plug-ins can reduce the need for redeployment of the larger application, as functionality can be added through the plug-ins without modifying or redeploying the application itself. The common examples are the plug-ins used in web browsers to add new features such as search-engines, virus scanners, or the ability to utilize a new file type, such as a new video format.

The network may include public networks, private networks, or a combination thereof. The network may include, but are not limited to personal area networks (PANs), local area networks (LANs), wide area networks (WANs), and so forth. The networks (e.g., network 190) can communicate using Ethernet, Wi-Fi™, Bluetooth®, ZigBee®, 3G, 4G, or other technologies.

Figure 7:
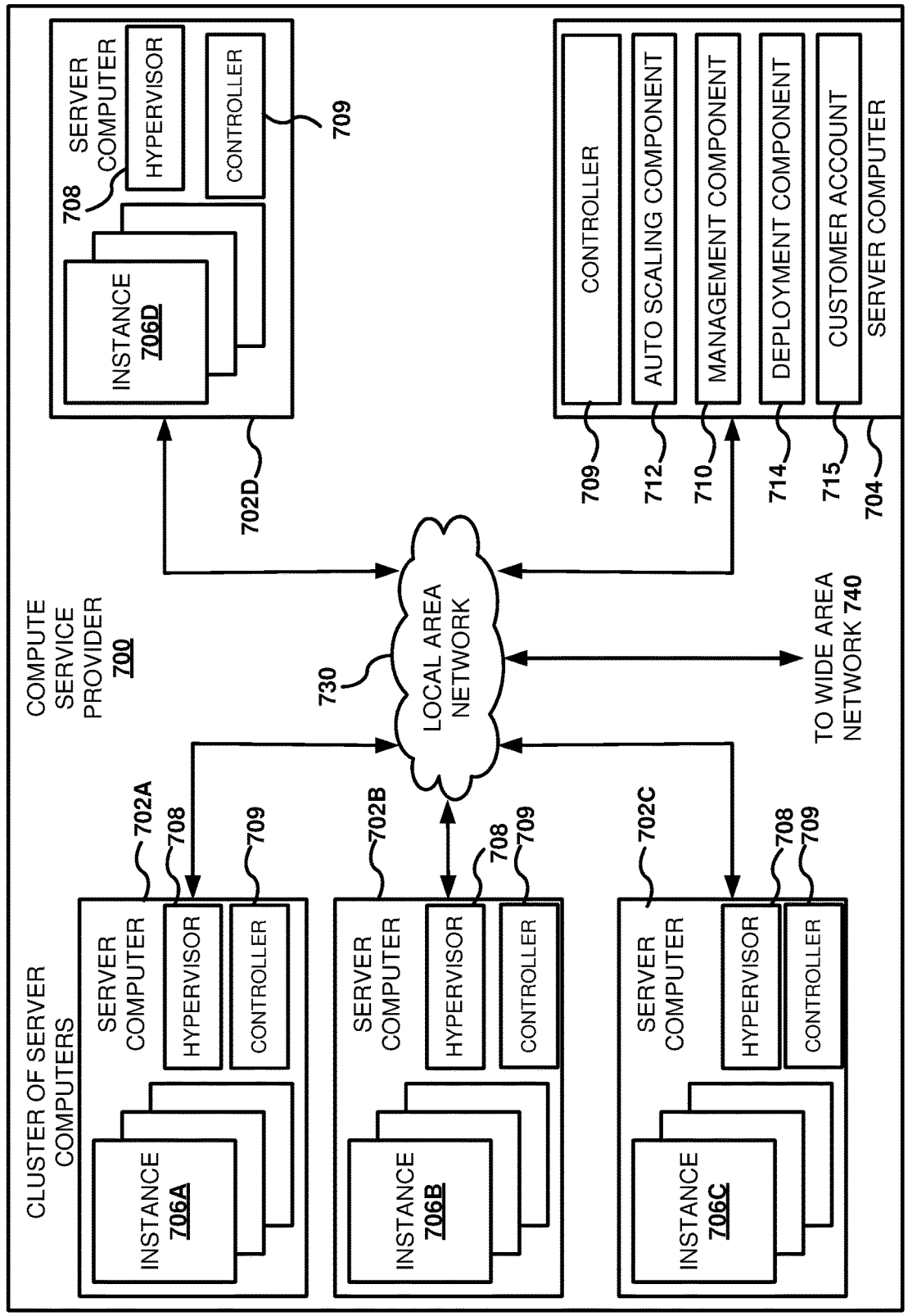
FIG. 7 is an example system diagram showing a plurality of virtual machine instances running in a multi-tenant environment.

FIG. 7 is a computing system diagram of a network-based compute service provider 700 that illustrates one environment in which embodiments described herein can be used. For example, the network-based compute service provider 700 can provide services based at least in part on using RDMA transactions to transfer data between two or more physical or virtual hosts. By way of background, the compute service provider 700 (e.g., a the cloud provider) is capable of delivery of computing and storage capacity as a service to a community of end recipients. In an example embodiment, the compute service provider can be established for an organization by or on behalf of the organization. That is, the compute service provider 700 may offer a "private cloud environment." In another embodiment, the compute service provider 700 supports a multi-tenant environment, wherein a plurality of customers operate independently (e.g., a public cloud environment). Generally speaking, the compute service provider 700 can provide the following models: Infrastructure as a Service ("IaaS"), Platform as a Service ("PaaS"), and/or Software as a Service ("SaaS"). Other models can be provided. For the IaaS model, the compute service provider 700 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 700 using networked client devices, such as desktop computers, laptops, tablets, smartphones, etc. running web browsers or other lightweight client applications. Those skilled in the art will recognize that the compute service provider 700 can be described as a "cloud" environment.

The particular illustrated compute service provider 700 includes a plurality of server computers 702A-702D. While only four server computers are shown, any number can be used, and large centers can include thousands of server computers. The server computers 702A-702D can provide computing resources for executing software instances 706A-706D. In one embodiment, the instances 706A-706D are virtual machines. As known in the art, a virtual machine is an instance of a software implementation of a machine (e.g., a computer) that executes applications like a physical machine. In the example of virtual machine, each of the servers 702A-702D can be configured to execute a hypervisor 708 or another type of program configured to enable the execution of multiple instances 706 on a single server. Additionally, each of the instances 706 can be configured to execute one or more applications, including applications that perform RDMA transactions with the use of an RDMA controller 709.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 704 can be reserved for executing software components for managing the operation of the server computers 702 and the instances 706. For example, the server computer 704 can execute a management component 710. A customer can access the management component 710 to configure various aspects of the operation of the instances 706 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 712 can scale the instances 706 based upon rules defined by the customer. In one embodiment, the auto scaling component 712 allows a customer to specify scale-up rules for use in determining when new instances should be instantiated and scale-down rules for use in determining when existing instances should be terminated. The auto scaling component 712 can consist of a number of subcomponents executing on different server computers 702 or other computing devices. The auto scaling component 712 can monitor available computing resources over an internal management network and modify resources available based on need.

A deployment component 714 can be used to assist customers in the deployment of new instances 706 of computing resources. The deployment component can have access to account information associated with the instances, such as who is the owner of the account, credit card information, country of the owner, etc. The deployment component 714 can receive a configuration from a customer that includes data describing how new instances 706 should be configured. For example, the configuration can specify one or more applications to be installed in new instances 706, provide scripts and/or other types of code to be executed for configuring new instances 706, provide cache logic specifying how an application cache should be prepared, and other types of information. The deployment component 714 can utilize the customer-provided configuration and cache logic to configure, prime, and launch new instances 706. The configuration, cache logic, and other information may be specified by a customer using the management component 710 or by providing this information directly to the deployment component 714. The instance manager can be considered part of the deployment component.

Customer account information 715 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 730 can be utilized to interconnect the server computers 702A-702D and the server computer 704. The network 730 can be a local area network (LAN) and can be connected to a Wide Area Network (WAN) 740 so that end users can access the compute service provider 700. Data for initiating and performing RDMA transactions described herein can be transferred by the network between any of the server computers 702A-702D, the server computer 704, and/or server computers accessed via the WAN 740. It should be appreciated that the network topology illustrated in FIG. 7 has been simplified and that many more networks and networking devices can be utilized to interconnect the various computing systems disclosed herein.

IX. Example Compute Service Provider Management Components

Figure 8:
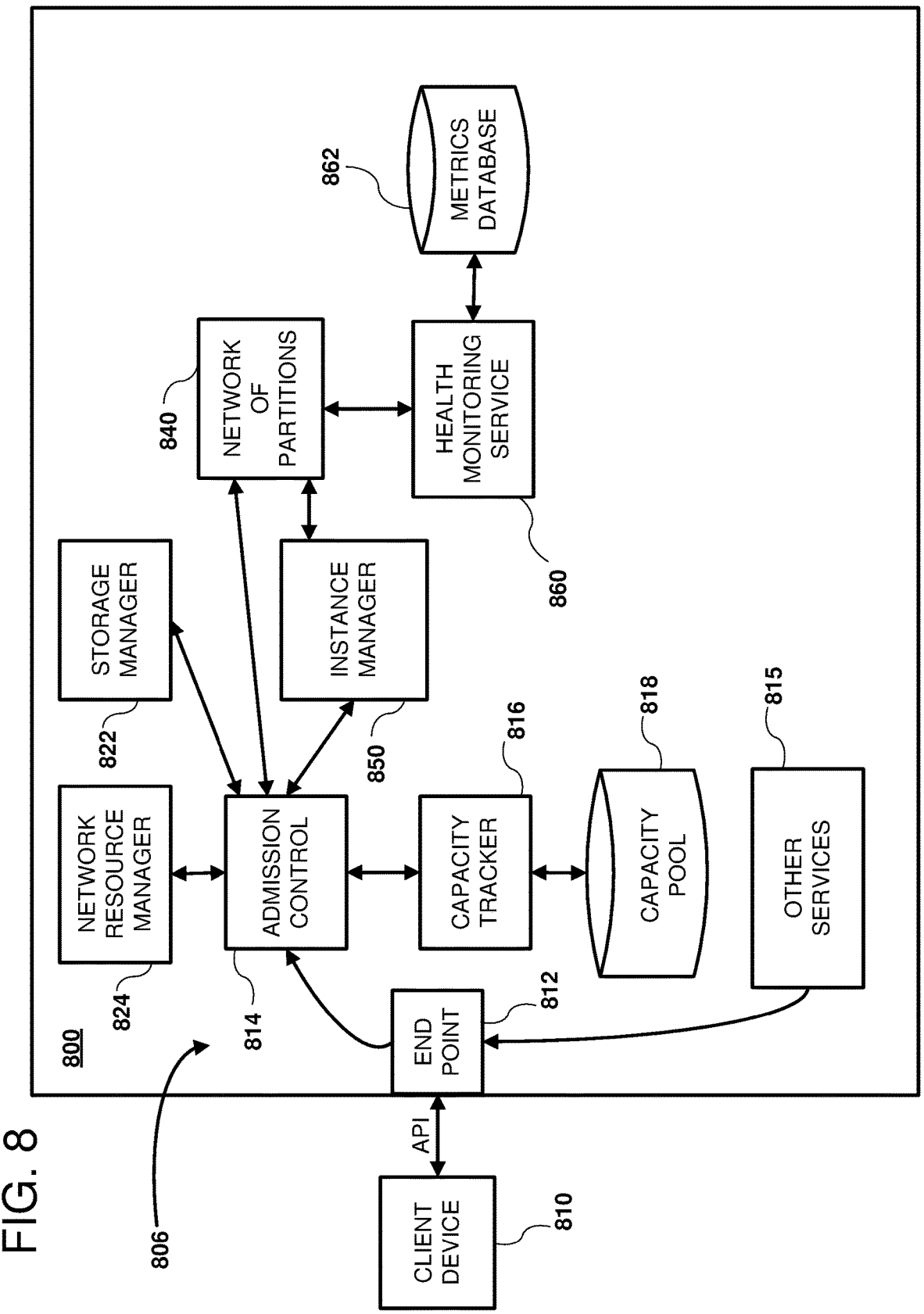
FIG. 8 shows further details of an example system including a plurality of management components associated with a control plane.

FIG. 8 illustrates in further detail management components 806 that can be used in the multi-tenant environment 800 of the compute service provider 700. In order to access and utilize instances (such as instances 706 of FIG. 7), a client device can be used. The client device 810 can be any of a variety of computing devices, mobile or otherwise including a cell phone, smartphone, handheld computer, Personal Digital Assistant (PDA), desktop computer, etc. The client device 810 can communicate with the compute service provider 700 through an end point 812, which can be a DNS address designed to receive and process API requests. In particular, the end point 812 can be a web server configured to expose an API. Using the API requests, a client 810 can make requests to implement any of the functionality described herein. Other services 815, which can be internal to the compute service provider 700, can likewise make API requests to the end point 812.

Other general management services that may or may not be included in the compute service provider 700 include an admission control 814, e.g., one or more computers operating together as an admission control web service. The admission control 814 can authenticate, validate and unpack the API requests for service or storage of data within the compute service provider 700. The capacity tracker 816 is responsible for determining how the servers need to be configured in order to meet the need for the different instance types by managing and configuring physical inventory in terms of forecasting, provisioning and real-time configuration and allocation of capacity. The capacity tracker 816 maintains a pool of available inventory in a capacity pool database 818. The capacity tracker 816 can also monitor capacity levels so as to know whether resources are readily available or limited. An instance manager 850 controls launching and termination of instances in the network. When an instruction is received (such as through an API request) to launch an instance, the instance manager pulls resources from the capacity pool 818 and launches the instance on a decided upon host server computer. Similar to the instance manager are the storage manager 822 and the network resource manager 824. The storage manager 822 relates to initiation and termination of storage volumes, while the network resource manager 824 relates to initiation and termination of routers, switches, subnets, etc. Data can be communicated using RDMA transactions to send data between any of computers depicted in FIG. 7, including the client device 810, the network resource manager 824, and the network of partitions 840. A network of partitions 840 is described further in relation to FIG. 9 and includes a physical layer upon which the instances are launched.

A health monitoring service 860 can provide monitoring for resources and the applications customers run on the compute service provider 700. System administrators can use the monitoring service 860 to collect and track metrics, and gain insight to how applications are running. For example, the monitoring service 860 can allow system-wide visibility into application performance and operational health. Metrics generated by the health monitoring service 860 can be stored in the metrics database 862.

X. Example Partitions and Associated Hardware

Figure 9:
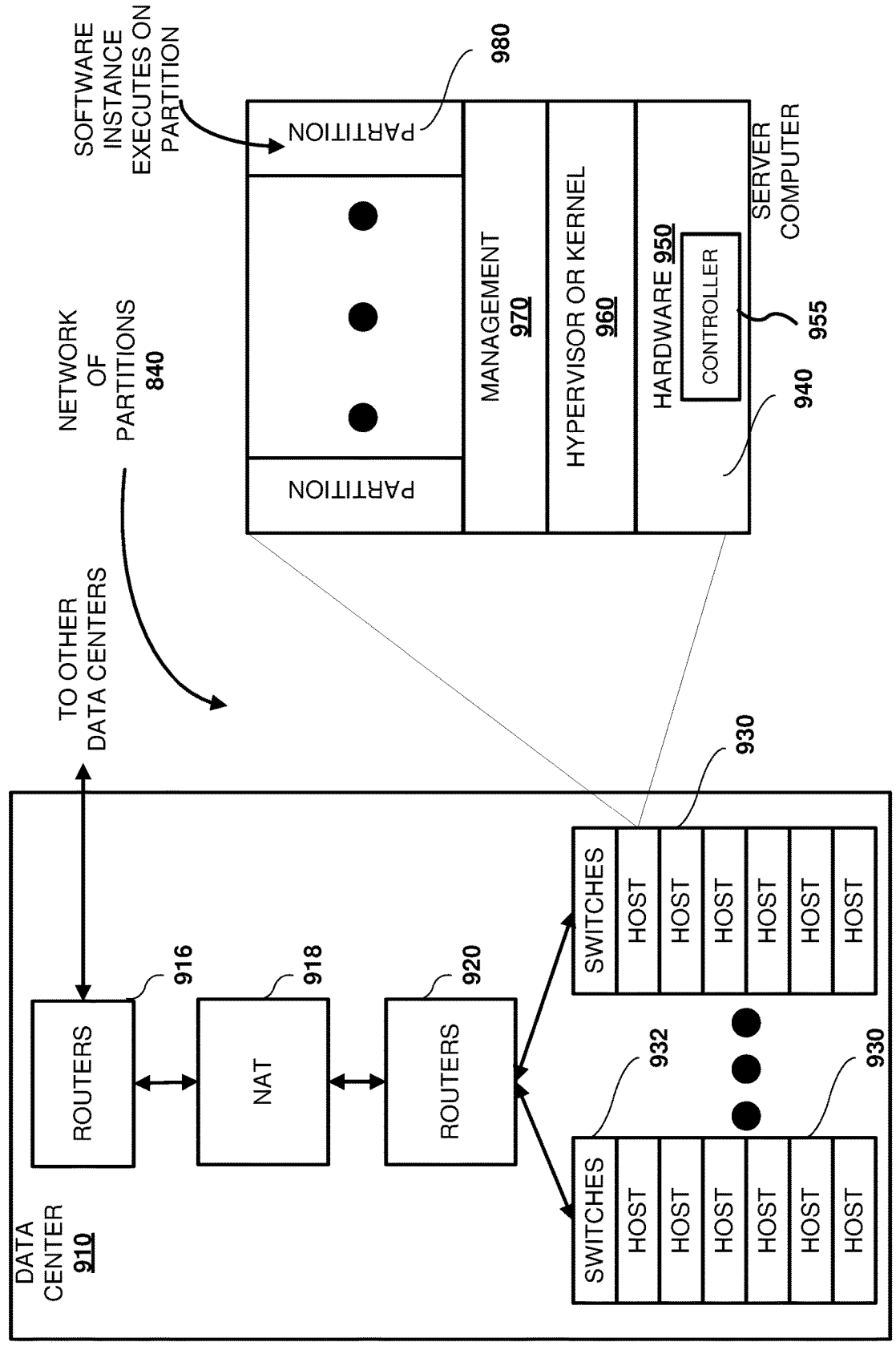
FIG. 9 shows an example of a plurality of host computers, routers and switches, which are hardware assets used for running virtual machine instances.

FIG. 9 illustrates the network of partitions 840 and the physical hardware associated therewith. The network of partitions 840 can include a plurality of data centers, such as data center 910, coupled together by routers 916. The routers 916 read address information in a received packet and determine the packet's destination. If the router decides that a different data center contains a host server computer, then the packet is forwarded to that data center. If the packet is addressed to a host in the data center 910, then it is passed to a network address translator (NAT) 918 that converts the packet's public IP address to a private IP address. The NAT also translates private addresses to public addresses that are bound outside of the datacenter 910. Additional routers 920 can be coupled to the NAT to route packets to one or more racks of host server computers 930. Each rack 930 can include a switch 932 coupled to multiple host server computers. A particular host server computer is shown in an expanded view at 940.

Each host 940 has underlying hardware 950 including one or more CPUs, memory, storage devices, etc. The hardware 950 can include one or more RDMA controllers 955 for acceleration of RDMA transactions between partitions on the same server or between partitions residing on different servers. Running a layer above the hardware 950 is a hypervisor or kernel layer 960. The hypervisor or kernel layer can be classified as a type 1 or type 2 hypervisor. A type 1 hypervisor runs directly on the host hardware 950 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 970 can be part of the hypervisor or separated therefrom and generally includes device drivers needed for accessing the hardware 950. The partitions 980 are logical units of isolation by the hypervisor. Each partition 980 can be allocated its own portion of the hardware layer's memory, CPU allocation, storage, etc. Further, any of the partitions can initiated and perform RDMA transactions using the technologies described herein. For examples, the partitions can act as target and/or source hosts and use one or more RDMA controllers in the hardware 950 to accelerate RDMA transactions using transaction identifiers and local memory. Additionally, each partition can include a virtual machine and its own guest operating system. As such, each partition is an abstract portion of capacity designed to support its own virtual machine independent of the other partitions.

Any applications executing on the instances can be monitored using the management layer 970, which can then pass the metrics to the health monitoring service 860 for storage in the metrics database 862. Additionally, the management layer 970 can pass to the monitoring service 850 the number of instances that are running, when they were launched, the operating system being used, the applications being run, etc. All such metrics can be used for consumption by the health monitoring service 860 and stored in database 862.

XI. Example Computing Environment

Figure 10:
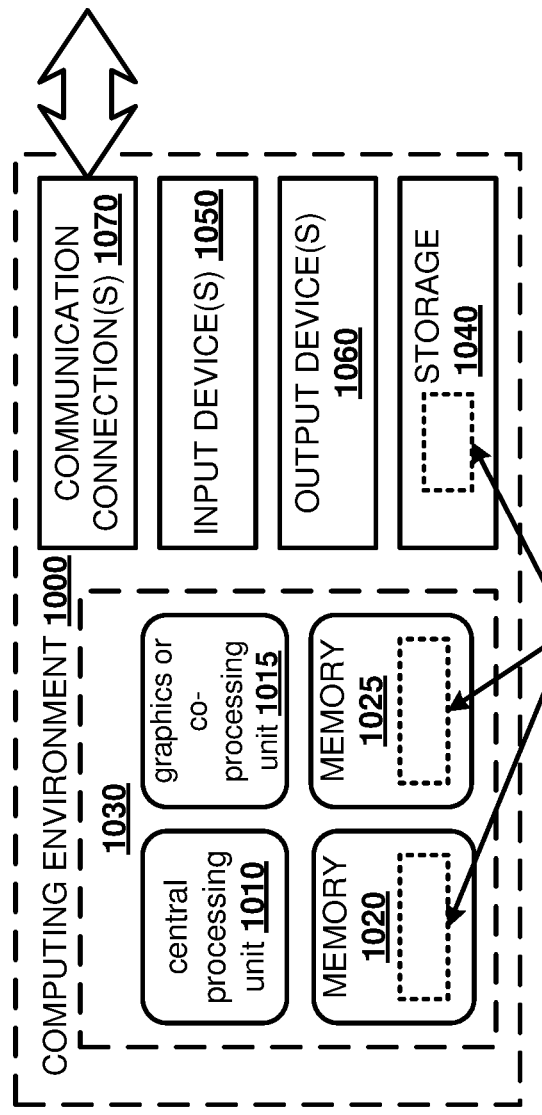
FIG. 10 depicts a generalized example of a suitable computing environment in which the described innovations can be implemented.

FIG. 10 depicts a generalized example of a suitable computing environment 1000 in which the described innovations may be implemented. The computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, etc.)

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions, including instructions for implementing host operations for RDMA transactions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing environment 1000. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. RDMA transactions can be accelerated using an RDMA controller coupled to the communications connections(s) 1070. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, assembly code, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed technology may be applied, it should be recognized that the illustrated embodiments are only examples and should not be taken as limiting the scope of the claimed subject matter. Rather, the scope of the invention is defined by the following claims. We therefore claim as our invention all that comes within the scope of these claims.

What is claimed is:

1. An apparatus comprising:
 a network adapter configured to transmit and receive remote direct memory access (RDMA) packets via a network connection;
 an RDMA controller coupled to the network adapter;
 a transaction memory coupled to the RDMA controller, the transaction memory being configured to store transaction identifiers and context data only for active RDMA transactions being processed by the RDMA controller, the transaction identifiers and context data being derived from combining two or more fields of their respective RDMA headers for the active RDMA transactions;
 a host coupled to the network adapter, the host comprising a host processor and a main memory, the main memory being configured to store context data transaction identifiers for all RDMA transactions, the host processor being configured to perform, in response to receiving an RDMA initiation packet, a check to determine whether an RDMA operation can be accelerated using the RDMA controller;
 the transaction memory being not directly accessible to the host processor; and
 the RDMA controller being configured to accelerate the RDMA operation by bypassing the host, wherein accelerating the RDMA operation comprises:
 responsive to receiving the RDMA initiation packet indicating initiation of an RDMA transaction, generate and store a first transaction identifier in the transaction memory, the first transaction identifier being derived from an RDMA header of the RDMA initiation packet, generate and store RDMA context data for the RDMA transaction in the transaction memory at a memory address associated with the first transaction identifier, the RDMA context data being generated from combining two or more fields of the RDMA initiation packet, receive data sent with additional RDMA packets for the initiated RDMA transaction, the data including information extracted from two or more fields of one or more RDMA headers of the additional RDMA packets, generate a second transaction identifier based on the information extracted from the one or more RDMA headers of the additional RDMA packets, the second transaction identifier matching the first transaction identifier, with the second transaction identifier, retrieve at least a portion of the context data from the memory address associated with the first transaction identifier in the transaction memory, and based on the retrieved context data, determine a target location in the main memory and perform at least a portion of the RDMA transaction, the determined target location being used for the performing at least a portion of the RDMA transaction.

2. The apparatus of claim 1, wherein the RDMA controller is further configured to validate the RDMA transaction by comparing the context data stored in the transaction memory at the memory address associated with the first transaction identifier to the data received with the additional RDMA packets, and wherein the transaction memory is not part of the network adapter.

3. The apparatus of claim 1, wherein:
the context data is retrieved by performing a content-addressable memory (CAM) lookup using the second transaction identifier.

4. The apparatus of claim 1, wherein the transaction memory comprises static random access memory (SRAM), and wherein the transaction memory, the RDMA controller, and the network adapter are attached to a single network interface card that is coupled to a main board for the host processor.

5. The apparatus of claim 1, wherein the apparatus is further configured to generate the RDMA context data from the RDMA initiation packet by using at least of: a memory address at which to store information for the RDMA transaction, a parameter to write or shift as part of executing the RDMA transaction, or a stride length.

6. The apparatus of claim 1, wherein the context data is determined from an RDMA header but not determined from a network protocol header.

7. A method comprising:
receiving, from a source host computer, data in remote direct memory access (RDMA) packets via a network adapter;

performing, by a host processor in a different, target host computer in response to receiving an RDMA initiation packet, a check to determine whether an RDMA operation is qualified to be accelerated using an RDMA controller in the target host computer;

deriving, by the RDMA controller, a transaction identifier from information extracted from an RDMA header of at least one of the received RDMA packets;

associating the derived transaction identifier with an active RDMA transaction hosted by the network adapter; and performing, by the RDMA controller, an RDMA operation using at least a portion of the received data, a destination address of the RDMA operation being in a host memory accessible to the host processor, the destination address being based at least in part on a memory address determined using RDMA context data stored for the transaction identifier in a transaction memory not accessible to the host processor, the transaction memory storing RDMA context data only for active RDMA transactions, wherein the performing the RDMA operation comprises:
determining, by the target host computer, whether one of the received RDMA packets is qualified for acceleration, when the RDMA controller determines the received RDMA packet is qualified for acceleration, determining the memory address without using a host memory translation table, and when the RDMA controller determines the received RDMA packet is not qualified for acceleration, handing off further processing of the received RDMA packet to the host processor of the target host computer.

8. The method of claim 7, wherein the performing the RDMA operation comprises a direct memory access that copies data from the RDMA packets to the host memory without using the host processor.

9. The method of claim 7, wherein the performing the RDMA operation comprises generating a guest virtual machine physical memory address without using a guest virtual machine memory translation table.

10. The method of claim 7, wherein the transaction identifier is a first transaction identifier, the method further comprising:
receiving identifying data in at least one of the received RDMA packets including instructions to initiate the active RDMA transaction;

initiating the active RDMA transaction, the initiating including deriving and storing the identifying data in the transaction memory not accessible to the host processor, the stored identifying data being indexed by a second transaction identifier based on the derived identifying data; and wherein the associating the derived transaction identifier is based on mapping the first transaction identifier to the second transaction identifier.

11. The method of claim 7, wherein the transaction identifier is a first transaction identifier, the method further comprising:
initiating the active RDMA transaction, the initiating including accessing identifying data stored in the host memory accessible to the host processor and storing the context data in the transaction memory not accessible to the host processor, the stored context data being indexed by a second transaction identifier based on the accessed identifying data; and wherein the associating the derived transaction identifier is based on mapping the first transaction identifier to the second transaction identifier.

12. The method of claim 7, wherein the transaction identifier is a first transaction identifier, the method further comprising:
with an RDMA controller, validating the RDMA transaction by comparing a second transaction identifier indexing context data, the context data being stored in the transaction memory not accessible to the host processor, to the data received with the RDMA packets; and:

if the comparing indicates a match with the second transaction identifier stored in the transaction memory not accessible to the host processor, then performing the RDMA operation with the RDMA controller, and if the comparing indicates a mismatch with the second transaction identifier stored in the transaction memory not accessible to the host processor, then sending a signal to the host processor or to an RDMA co-processing engine to cause the host processor or the RDMA co-processing engine to perform the RDMA transaction.

13. The method of claim 7, wherein:
the active RDMA transaction is a plurality of two or more RDMA transactions, the plurality of RDMA transactions being assigned to memory locations within the same portion of the host memory.

14. The method of claim 7, wherein a plurality of RDMA packets are received via the network adapter in an out-of-order fashion from an order in which the RDMA packets were sent, and wherein the deriving, the associating, and the performing the RDMA operation are performed for each of the received plurality of RDMA packets.

15. The method of claim 7, wherein the memory address is determined using address information previously stored in the transaction memory, and wherein the transaction memory is not part of the network adapter.

16. The method of claim 15, wherein the transaction memory comprises: volatile memory or non-volatile memory, and wherein the memory further comprises: static random access memory (SRAM), dynamic random access memory (DRAM), electrically erasable programmable read only memory (EEPROM), flash memory, ferroelectric random access memory (FeRAM), magnetoresistive random access memory (MRAM), or memristor-based memory.

17. The method of claim 7, further comprising validating the received RDMA packet by comparing at least a portion of an RDMA header field of the RDMA packet with information stored in the transaction memory not accessible to the host processor that is addressed using the derived transaction identifier.

18. The method of claim 7, wherein the RDMA context data includes at least one of the following: connection information, connection state information, state machine information for the connection, counters, or buffer scatter gather lists.

19. The method of claim 7, wherein the determining whether one of the received RDMA packets is qualified for acceleration is performed by at least one of:
determining the one of the received RDMA packets is received for an RDMA operation that is designated to be qualified for acceleration;
determining the one of the received RDMA packets was received from a machine or network location designated to be qualified for acceleration; or
determining the RDMA protocol for the one of the received RDMA packets.

20. One or more computer-readable storage media storing computer-readable instructions that upon execution by a controller, cause the controller to perform the method of claim 7.

21. A system, comprising:
a remote direct memory access (RDMA) source system and a RDMA target system configured to communicate with each other using a computer network;
the RDMA source system being further configured to:
send data for an RDMA transaction via the computer network to the RDMA target system, the data including RDMA header fields that can be used by the RDMA target system to identify the RDMA transaction; and
the RDMA target system being further configured to:
receive the data for the RDMA transaction via the computer network;
responsive to receiving the data for the RDMA transaction, produce a transaction identifier for the RDMA transaction from one or more of the RDMA header fields included in the data;
obtain RDMA context information for the RDMA transaction by accessing a memory address associated with the transaction identifier stored in a transaction memory, the transaction memory being accessible by an RDMA controller coupled to the transaction memory and storing context information only for active RDMA transactions being processed by the RDMA controller, the RDMA context information being generated and stored by the RDMA controller based at least in part on information extracted from RDMA header fields in the data;
the RDMA target system comprising a processor and main memory hosting an operating system, the main memory storing context data for all RDMA transactions of the target system;
the transaction memory and the stored context information being not visible to the processor-hosted operating system; and
the RDMA controller completing the RDMA transaction by copying at least a portion of the received data to the main memory directly, without using the processor.

22. The system of claim 21, wherein the data is sent as a plurality of data packets via the computer network, and wherein at least one packet of the plurality of data packets is received by the target system in a different order than an order in which the RDMA source system sent the at least one packet.

23. The system of claim 21, wherein the RDMA target system is further configured to:
perform an RDMA operation using a portion of the received data, a destination of the RDMA operation being based on the memory address determined by the accessing the transaction memory.

24. The system of claim 23, wherein the transaction identifier is a first transaction identifier, wherein the RDMA target system is further configured to, with an RDMA controller coupled to a network adapter:
receive RDMA packets including instructions to initiate the first RDMA transaction; and
initiate the first RDMA transaction by deriving and storing the transaction identifier in the transaction memory, the stored transaction identifier being indexed by a second transaction identifier, wherein the associating the derived transaction identifier is based on mapping the first transaction identifier to the second transaction identifier.

25. The system of claim 23, wherein the RDMA target system is further configured to perform the RDMA operation by generating a physical memory address without using a host memory translation table.

26. The system of claim 23, wherein the RDMA target system is further configured to perform the RDMA operation by generating a guest virtual machine physical memory address without using a guest virtual machine memory translation table.

27. The system of claim 21, wherein the first RDMA transaction is a plurality of two or more RDMA transactions, the plurality of RDMA transactions being assigned to memory locations within the same portion of memory of the RDMA target system.

28. The system of claim 21, wherein the RDMA target system validates the first RDMA transaction by:
   validating RDMA header data in the received data against the stored context information for the RDMA transaction in the transaction memory.

29. The system of claim 21, wherein the RDMA controller is further configured to:
   validate the RDMA transaction by comparing the context information stored in the transaction memory for the RDMA transaction to the received data for the RDMA transaction, the transaction memory being not accessible to the processor or an RDMA co-processing engine of the RDMA target system; and:
   if the comparing indicates a match with the stored context information, then performing an RDMA operation for the RDMA transaction with the RDMA controller, and
   if the comparing indicates a mismatch with the stored context information, then sending a signal to the processor or to the RDMA co-processing engine to cause the processor or the RDMA co-processing engine to perform the RDMA operation.

30. The system of claim 21, wherein the RDMA target system performs the first RDMA transaction by:
   determining a mismatch between header data in the received data for the RDMA transaction and the stored context information for the RDMA transaction; and
   based on the mismatch, transferring processing of the RDMA transaction to the processor hosting the operating system.

31. The system of claim 21, wherein the processor is implemented with: a digital signal processor, a microprocessor, an application-specific integrated circuit, or a soft processor implemented with reconfigurable logic.

32. The system of claim 21, wherein the main memory comprises a connection database that stores connection information for RDMA connections that can be serviced by the RDMA source system or the RDMA target system, and wherein the transaction memory comprises an active transaction database storing only context information related to currently active RDMA transactions.

* * * * *